Oct. 24, 1950     A. J. MEYERHOFF ET AL     2,526,891
METHOD OF TESTING ELECTRICAL CONDUCTORS
Filed June 11, 1947
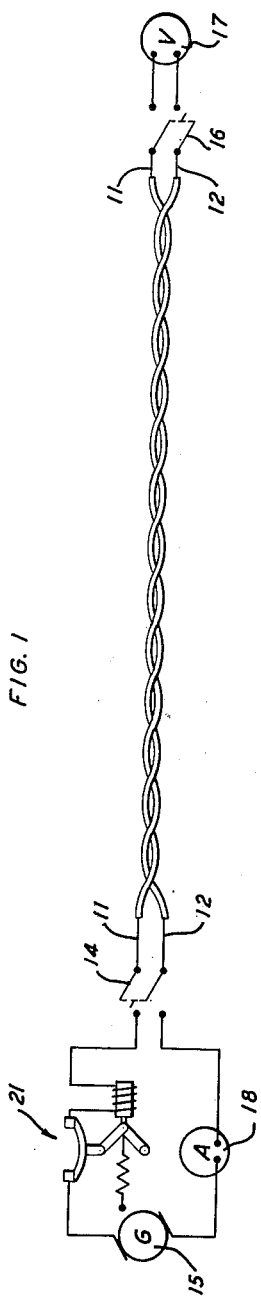
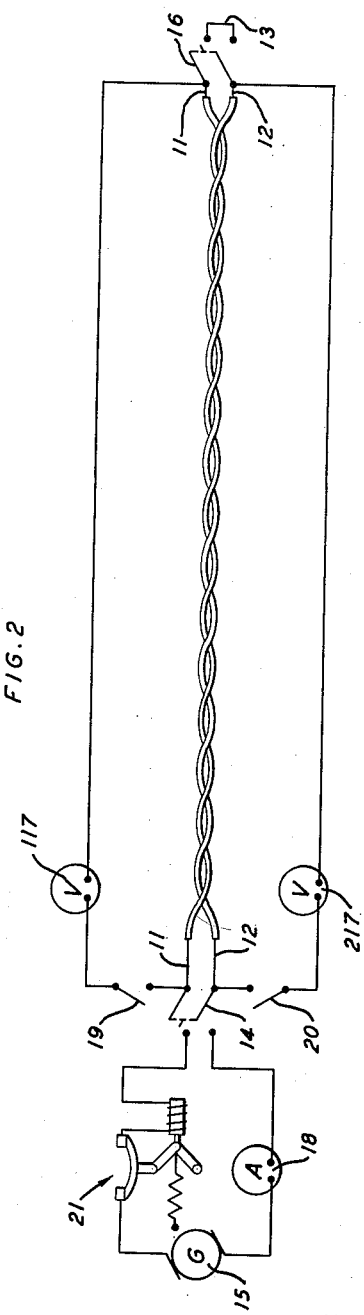
INVENTORS
A. J. MEYERHOFF
J. H. SULZER
BY W. E. Parnell
ATTORNEY Patented Oct. 24, 1950

2,526,891

UNITED STATES PATENT OFFICE 2,526,891

METHOD OF TESTING ELECTRICAL CONDUCTORS

Albert J. Meyerhoff, Newark, and John H. Sulzer, Union Beach, N. J., assignors to Western Electric Company, Incorporated, New York, N. Y., a corporation of New York Application June 11, 1947, Serial No. 753,928

5 Claims. (Cl. 175—183)

This invention relates to a method of testing electrical conductors and more particularly to a method of testing continuity and insulation of a pair of insulated conductor wires closely associated together, for example by being intertwisted together, and having the insulation thereon more or less moist.

In the manufacture of certain kinds of electric conductor cables for the communications arts, suitable copper wires are provided with sheaths of suitable insulating materials. These insulated wires are then intertwisted together in pairs; and subsequently such twisted pairs are put together, usually by twisting a suitable number of pairs together in one or another of the customary types of cabling machines. The insulating material of the sheaths on the wires may be of various kinds in various instances, seamless paper pulp, served or braided cotton, silk, rayon, nylon or the like, textile fiber threads, enamel, extruded seamless plastic, or other substances. It will often happen, either because of the mode of application of the sheath or because of storage conditions that the sheathing on the two members of a twisted pair of wire intended to be incorporated in a cable, may contain a considerable amount of moisture. Thus a twisted pair just put together with two wires fresh from a machine for sheathing the wires with paper pulp, may have sheaths containing an appreciable amount of water residual from the paper making process employed to create the sheaths. Again a similar pair sheathed some considerable while ago with originally dry textile fiber threads and held in warehouse storage may show a considerable amount of moisture absorbed by the textile material of the sheathing. Similarly, some enamel or extruded plastic coatings may have absorbed water in them. It is a time consuming and expensive matter to drive out such moisture, but a necessary one, when the time comes to form such pairs into the core of a finished cable. Hence it is desirable, often commercially necessary, to test each pair before it is dried, to make sure, first, that each of the two conductor wires is unbroken throughout its length, and, second, that their insulation is nowhere defective in such fashion as to give rise to electrical connection, i. e. a short circuit, between the two wires. With any appreciable amount of moisture in the sheaths, it becomes a difficult problem to make such tests. There are various successfully satisfactory methods and varieties of apparatus for making such tests on wires already incorporated into a cable sheath and therefore substantially bone dry. These fail, however, when there is any material amount of moisture in the sheaths of the wires, as in the case here at point, for such moisture either brings with it from its source or extracts from the substance of the sheaths, electrolytic substances, in vanishingly small amount it may be, yet sufficient to make the moisture a conductive path between the two wires, and so vitiates any tests which depend upon dielectric insulation between the wires.

An object of the present invention is to provide a method of testing a pair of physically closely associated insulated wires, e. g. a twisted pair, to detect a break in the continuity of either wire, or a short circuit between the two wires of the pair, and to distinguish between these two types of defect.

With the above and other objects in view as hereinafter described, the invention may be embodied in the method of testing a pair of closely associated insulated conductor wires having moisture in the insulation thereon for breaks in either or both wires and for short circuits between the wires, which method comprises steps of applying a direct current polarizing potential across the two wires for a period of time sufficient to create electrolytic polarization in the moisture of the sheaths, disconnecting the source of polarizing potential from the wires and measuring the electrolytic polarization potential residual in the moisture after disconnection of the polarizing potential.

Other objects and features of the invention will appear from the following detailed description of specific embodiments thereof, taken in connection with the accompanying drawing in which the same reference numerals are appended to identical parts in the several figures, and in which Fig. 1 is a schematic diagram of one form of apparatus constructed to carry out one form of the method of the invention; and Fig. 2 is a similar view of another form.

For clarity and convenience of description and discussion, it will be assumed that the immediate problem is to test for continuity and short circuits a twisted pair of copper wires each sheathed with a seamless sheath of paper pulp. Ordinarily such a pair is received from the twisting machine and wound on a reel for further handling or storage. The paper pulp sheaths may contain as much as 15% of its own weight of water, either residual from the making of the sheaths or absorbed from the atmosphere during storage, when the time comes to use a given reel of the twisted pair wires in the manufacture of a cable. It is necessary, before the reel is placed in the supply rack of the cabling machine, to dry out this moisture, which is done by placing the reel in an oven for the necessary length of time. It is also necessary to test each twisted pair before putting it into a cable, to be sure first that there are no discontinuities in either wire and, second, that there are no conductive connections or short circuits between the two wires of the pair at any point along their length. Obviously, if the test can be made before the reel is baked to dry the insulation, the labor, time and expense of uselessly baking a defective length of the wires may be avoided. Hitherto there has been no satisfactorily reliable method or apparatus for certainly detecting breaks or short circuits in the wire on such a reel of twisted pair wires with water present up to say 15% in the insulation. It must be remembered that, for example, a reel of paper pulp insulated 26 gauge (AWG) twisted pair wire may have wound up on it as much as 42,000 feet, or very nearly 8 miles of the twisted pair. Methods and apparatus which may be effective for a 100 foot or even a 1000 foot length as a laboratory experiment, fail completely when it comes to dealing with such lengths as are employed in commercial manufacture. In practice, of course, the moisture water in the insulating sheath contains, although in very minute proportion, some amount of electrolytically dissociable material, acidic, basic or saline, either originally contained in residual water from the pulp sheathing process or extracted from the substance of the pulp insulation by moisture absorbed from air, or extracted, it may be, by the moisture from the circumambient atmosphere. Such an electrolyte solution, although tenuously dilute and of high electrical resistance, when placed between copper electrodes eight miles long and only a few hundredths of an inch apart, as in the case of a twisted pair, will have an overall conductance sufficiently high to interfere fatally with any testing means or apparatus depending, for example, on electric capacitance between the two wires, or upon any assumed non-conductance between them. This electrolytic conductance may even be, and has been found to be in some instances, sufficient to bridge over and mask a complete break in one or even both of the wires, when lengths measured in terms of miles rather than feet are to be tested by means hitherto proposed.

However, applicants have discovered that the electrolytic effect itself may be made the characteristic means of effecting a satisfactory, simple and reliable method or apparatus for making the desired tests. Thus, as diagrammatically illustrated in Fig. 1, a twisted pair of pulp insulated wires 11 and 12 may be connected at one end, as shown at the left, to means, such as a switch 14 by which the wires 11 and 12 may be connected at this end to a source 15 of direct electrical potential, e. g. a 110 volt D. C. generator. Means, such as a switch 16, is connected to the right hand ends of the wires 11 and 12 whereby they may be there electrically connected to each other through a high resistance voltmeter 17. With the switch 16 open, the switch 14 is thrown to connect the generator 15 to the wires 11 and 12 and thus impose a 110 volt direct potential on them. This state of affairs is allowed to exist for a period of thirty to sixty minutes. With the switch 16 open there is no materially perceptible flow of current from pole to pole of the source 15. However, owing to the potential drop between the two wires along their lengths, there is a drift of whatever electrolytic ions are present in the moisture in the insulating sheaths of the wires, positive ions tending to move toward the negatively charged wire and negative ions toward the positive wire. Thus an electrolytic polarization is set up in the moisture in the sheaths. At the expiration of the polarizing period, the switch 14 is opened and the switch 16 is closed to connect the voltmeter 17 to the two otherwise supposedly disconnected wires 11 and 12. If the wires 11 and 12 are each continuously unbroken and if there are no conductive contacts, i. e. short circuits, between them, the voltmeter 17 will register a potential which in practice, in the case of such an eight mile pair as above described, will be of the order of 1.5 volts due to the electrolytic polarization in the moisture between the wires. If there exists a short circuit anywhere along the pair of wires, there will have no polarizing potential across their sheaths of any magnitude comparable to that imposed when there is no contact between the wires. Hence, in this case, no electrolytic polarization will be built up in the sheath and the voltmeter, when connected, will register no, or only negligible potential. Furthermore, if an ammeter 18 be connected in the polarizing circuit as shown, a short circuit between the wires 11 and 12 may be at once detected when the polarizing period is begun by the abnormally large current flow. If there is a break in continuity of either wire, the polarizing effect will ordinarily proceed from the left end only as far along to the right as to the break. Consequently when the voltmeter is connected across the wires after the polarizing current is broken, there will again be no potential registered by the voltmeter. Thus we may tabulate:

| ammeter showing during polarization | voltmeter showing after polarization | condition indicated |
|---|---|---|
| negligible | about 1.5 volts | no shorts, no breaks. |
| Do | negligible | one or both wires broken. |
| materially large | | short circuited wires. |

The arrangement and method above described is satisfactorily successful for its purpose except that under extreme conditions it may fail to indicate a break in one wire near the end remote from the generator if the insulation be unusually wet and also be abnormally contaminated with electrolytically dissociable material. In such case the electrolytic effect across the break in the wire may be sufficient to carry the polarizing potential across the break to the end of the wire and so enable the normal polarization to be built up between the wires all the way to the switch 16 as if both wires were unbrokenly continuous. Then when the polarizing current is broken and the voltmeter connected, the normal voltage shows as if the pair were perfect. Experience seems to show that this masking of a defect occurs only under the extreme conditions noted, i. e. maximum wetness and maximum contamination of the moisture. With reasonable care to avoid this double extreme of conditions the apparatus and method described will be practically satisfactory.

However, by the further refinement shown in Fig. 2, even this limit defect may be obviated. In this arrangement the wires 11 and 12, the switch 14, the current source 15, and the ammeter 18 are as before. But the switch 16 is arranged to connect the wires 11 and 12 at will to each other through a short circuiting member 13. Also a voltmeter 117 is connected across the wire 11 from end to end through a switch 19; and a voltmeter 217 is similarly connected across the wire 12 through a switch 20. In operation, the polarizing voltage from the source 15 is applied as before with the switch 16 open for thirty to sixty minutes and the switch 14 is then opened. If the ammeter 18 has shown a large deflection on closing the switch 14 originally, there is a short circuit between the wires 11 and 12; and the pair may be rejected at once without further test. Otherwise, when the switch 14 is opened at the end of the polarization period, the switches 19 and 20 are closed. If the readings of the two voltmeters 117 and 217 are markedly different, e. g. 0.8 and 0.05 volt, there is a break in the wire giving the high reading. If the readings of both voltmeters are high, e. g. 0.5 volt more or less, both wires are broken. If both voltmeters read low, e. g. 0.2 volt or less, the switch 16 is closed. If then a change occurs in the voltmeter readings there is no break in either wire and no short circuit between them; but if no detectable change appears in the voltmeter readings, there is a short circuit between the two wires.

Since a short circuit between the wires near the left end may provide a current path of dangerously high conductivity, for the polarizing voltage, a circuit-breaker is diagrammatically indicated at 21.

What is claimed is:

1. The method of testing a pair of closely associated insulated conductor wires having moisture in the insulation thereon for breaks in either or both wires and for short circuits between the wires, which method comprises steps of applying a direct current polarizing potential across one pair of adjacent ends of the two wires for a period of time sufficient to create electrolytic polarization in the moisture of the sheaths, disconnecting the source of polarizing potential from the wires, measuring the electrolytic polarization potentials along the two wires independently of each other residual in the moisture after disconnection of the polarizing potential, connecting the other pair of adjacent ends of the two wires together, and again measuring the electrolytic polarization potentials along the two wires independently of each other residual in the moisture after disconnection of the polarizing potential.

2. The method of testing a pair of closely associated insulated conductor wires for breaks in either or both wires and for metal to metal short circuits between the wires, said wires having so much moisture in the insulation as to establish a low resistance conductive path between the wires, which method comprises steps of applying a direct current polarizing potential across the two wires for a period of time longer than required to produce dielectric polarization and sufficient to create electrolytic polarization in the moisture of the insulation, disconnecting the source of polarizing potential from the wires and measuring the electrolytic polarization potential residual in the moisture after disconnection of the polarizing potential.

3. The method of testing a pair of closely associated insulated conductor wires for breaks in either or both wires and for metal to metal short circuits between the wires, said wires having so much moisture in the insulation as to establish a low resistance conductive path between the wires, which method comprises steps of applying a direct current polarizing potential across the two wires for a period of time longer than required to produce dielectric polarization and sufficient to create electrolytic polarization in the moisture of the insulation, disconnecting the source of polarizing potential from the wires and measuring the electrolytic polarization potential between the two wires residual in the moisture after disconnection of the polarizing potential.

4. The method of testing a pair of closely associated insulated conductor wires for breaks in either or both wires and for metal to metal short circuits between the wires, said wires having so much moisture in the insulation as to establish a low resistance conductive path between the wires, which method comprises steps of applying a direct current polarizing potential across the two wires for a period of time longer than required to produce dielectric polarization and sufficient to create electrolytic polarization in the moisture of the insulation, disconnecting the source of polarizing potential from the wires and measuring at the other pair of adjacent ends of the two wires the electrolytic polarization potential between the two wires residual in the moisture after disconnection of the polarizing potential.

5. The method of testing a pair of closely associated insulated conductor wires for breaks in either or both wires and for metal to metal short circuits between the wires, said wires having so much moisture in the insulation as to establish a low resistance conductive path between the wires, which method comprises steps of applying a direct current polarizing potential across the two wires for a period of time longer than required to produce dielectric polarization and sufficient to create electrolytic polarization in the moisture of the insulation, disconnecting the source of polarizing potential from the wires and measuring the electrolytic polarization potentials along the two wires independently of each other residual in the moisture after disconnection of the polarizing potential.

ALBERT J. MEYERHOFF.
JOHN H. SULZER.

REFERENCES CITED

The following references are of record in the file of this patent:

UNITED STATES PATENTS

| Number | Name | Date |
| --- | --- | --- |
| 752,158 | Hale | Feb. 16, 1904 |
| 1,494,330 | Austin | May 20, 1924 |
| 1,904,598 | Anderson | Apr. 18, 1933 |
| 1,906,466 | Haskins | May 2, 1933 |
| 2,044,424 | Edwards et al. | June 16, 1936 |
| 2,091,616 | Stoekle | Aug. 31, 1937 |
| 2,105,542 | Martensson | Jan. 18, 1938 |

OTHER REFERENCES

Publication: "Measuring Capacity," by I. Queen, page 602, Fig. 1, of July 1944.

Publication: "Electrical Measurements," by Laws, McGraw-Hill Book Co., 1917, pages 209–212.